US010479447B2

(12) United States Patent
Deleval

(10) Patent No.: US 10,479,447 B2
(45) Date of Patent: Nov. 19, 2019

(54) POWERTRAIN FOR A PEDAL VEHICLE

(71) Applicant: E2 DRIVES SA, Louvain-la-Neuve (BE)

(72) Inventor: Arthur Deleval, Louvain-la-Neuve (BE)

(73) Assignee: E2 DRIVES SA, Louvain-la-Neuve (BE)

( * ) Notice: Subject to any disclaimer, the term of this patent is extended or adjusted under 35 U.S.C. 154(b) by 175 days.

(21) Appl. No.: 15/507,448

(22) PCT Filed: Sep. 1, 2015

(86) PCT No.: PCT/EP2015/069929
§ 371 (c)(1),
(2) Date: Feb. 28, 2017

(87) PCT Pub. No.: WO2016/034574
PCT Pub. Date: Mar. 10, 2016

(65) Prior Publication Data
US 2017/0291660 A1    Oct. 12, 2017

(30) Foreign Application Priority Data
Sep. 2, 2014    (BE) .................................. 2014/0661

(51) Int. Cl.
*B62M 11/14*    (2006.01)
*B62M 6/45*    (2010.01)
(Continued)

(52) U.S. Cl.
CPC .............. *B62M 11/14* (2013.01); *B62M 6/45* (2013.01); *B62M 6/50* (2013.01); *B62M 6/55* (2013.01); *B62K 2207/04* (2013.01)

(58) Field of Classification Search
CPC .......... B62M 11/14; B62M 6/45; B62M 6/50; B62M 6/55
(Continued)

(56) References Cited

U.S. PATENT DOCUMENTS 4,715,246 A * 12/1987 Hartmann ................ B62M 1/36
280/236
4,721,015 A *  1/1988 Hartmann .............. B62M 11/18
280/260
(Continued)

FOREIGN PATENT DOCUMENTS

EP    0937600 A2    8/1999
EP    2218634 A1    8/2010
(Continued)

OTHER PUBLICATIONS

Japanese Office Action for corresponding Japanese Patent Application No. 2017-511767 dated Jun. 4, 2019 with English Translation.

*Primary Examiner* — Jacob D Knutson
(74) *Attorney, Agent, or Firm* — Browdy and Neimark, PLLC

(57) ABSTRACT

Powertrain for a pedal vehicle Powertrain for a pedal vehicle comprising a first (20) and a second (4) motor as well as an planetary gearing (3) having a planet carrier (14, 114), a ring gear (12, 112) and a sun gear (13), which first motor (20) is connected to the planetary gearing (3), which powertrain also comprises a crank axle (11) to which the ring gear (12, 112) is connected to create a first input to the planetary gearing (3), the second motor (4) is geared to the crank axle (11), a control unit (6) being designed to regulate the first motor (20) according to an angular position setpoint, and the second motor (4) according to a current or torque setpoint.

16 Claims, 6 Drawing Sheets

(51) Int. Cl.
*B62M 6/55* (2010.01)
*B62M 6/50* (2010.01)

(58) Field of Classification Search
USPC .................................................. 180/206.3
See application file for complete search history.

(56) References Cited

U.S. PATENT DOCUMENTS

| | | | | |
|---|---|---|---|---|
| 4,842,291 | A * | 6/1989 | Hartmann | B62M 11/18 280/238 |
| 6,296,072 | B1 * | 10/2001 | Turner | B62M 6/45 180/206.2 |
| 7,373,232 | B2 * | 5/2008 | Guderzo | B62M 9/122 474/116 |
| 8,919,478 | B2 * | 12/2014 | Gao | B62M 6/55 180/206.4 |
| 9,302,734 | B2 * | 4/2016 | Getta | B62M 6/55 |
| 2017/0274963 | A1 * | 9/2017 | Yamamoto | B62M 6/55 |

FOREIGN PATENT DOCUMENTS

| | | | |
|---|---|---|---|
| EP | 2735501 | A1 | 5/2014 |
| JP | 10138986 | A | 5/1998 |
| JP | H11-79060 | A | 3/1999 |
| JP | 2005041480 | A | 2/2005 |
| JP | 2008-285069 | A | 11/2008 |
| JP | 2013217467 | A | 10/2013 |
| WO | 2013160477 | A1 | 10/2013 |
| WO | 2014081105 | A1 | 5/2014 |

* cited by examiner

Fig. 2A
Control scheme for first motor
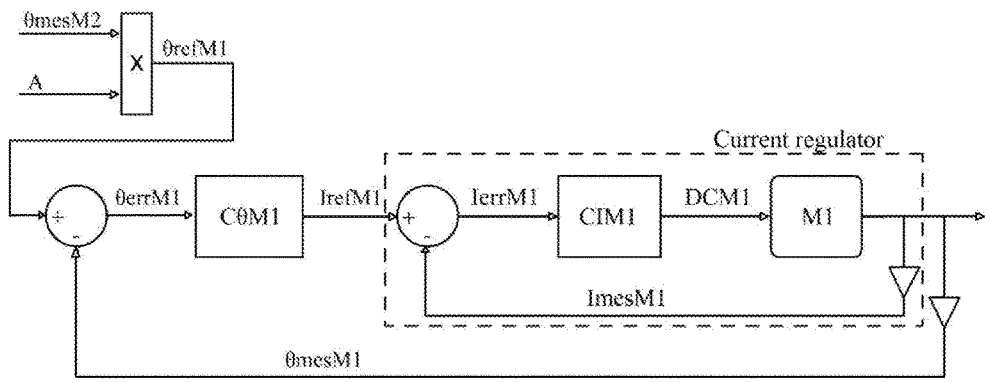
Fig. 2B
Control scheme for second motor
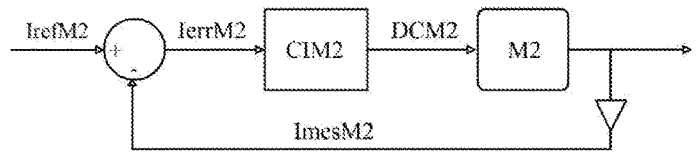
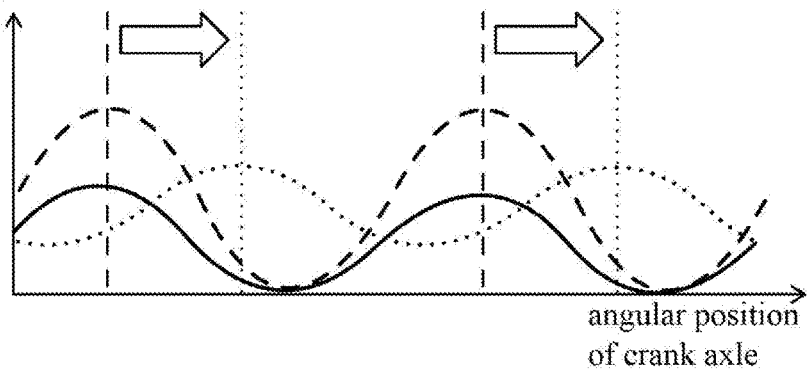
Legend:
―――― torque supplied by user
― ― ― torque supplied by first motor
········· torque supplied by second motor
Fig. 3

POWERTRAIN FOR A PEDAL VEHICLE

The present invention relates to a powertrain for a pedal vehicle, particularly a bicycle, which powertrain comprises a first and a second motor and an planetary gear system with a planet carrier, a ring gear and a sun gear, and provides both functions, that is to say electric power assistance and an electric system for changing speed ratios, wherein the speed ratio is defined between the pedal and the output from the housing that connects the wheel by a transmission element.

Such a powertrain is capable of providing electric assistance in proportion to the pedalling torque (pedalling power) to which the two motors contribute. The first motor is used so as to provide a certain speed ratio between the pedal and the output chainring. The second motor is used so as to ensure that the level of assistance selected by the cyclist is maintained.

Such a powertrain is known from the patent application WO 2013/160477. As described in that application, the first and second motors are equipped respectively with a first and a second sensor, each being designed to measure the angular velocity of the motor with which it is associated. The first and second sensors are connected to a control unit, a third sensor designed to measure the speed at which the bicycle is being propelled by the cyclist is also connected to said control unit, and the powertrain comprises a measuring element designed to produce a measurement signal indicating the torque supplied by the first motor, the control unit is designed to produce a first and a second control signal based on the speeds measured by the sensors and on preset setpoints as well as the measurement signal indicating torque, said first control signal being a rotating speed regulating signal which is sent to the first motor, and said second control signal being a torque regulating signal which is sent to the second motor.

One disadvantage of the known powertrain is the first motor's limited dynamic response capability due to the speed measuring system and the value of the setpoint assigned to the regulator thereof. This delay in the response by said first motor limits the amount of torque that can be transferred from the pedal to the output chainring of the system and gives rise to a slipping sensation which may seem strange to the user. In fact, as described in the patent application for the known powertrain, the control signal that is provided to the first motor is a speed setpoint that depends on the speed measured by the second motor's measuring system. Measurement of the speed of a rotating component, such as the rotor of an electric motor, is generally performed with the aid of a position sensor (of any kind), the signal from which is post-processed to obtain a value for the rotating speed. The simplest way to do this is to measure the time between two positions and divide the angle between these two positions by said time. This procedure has the effect of causing the position to drift temporally, which introduces a time lag into the measurement and threatens to add measurement noise. Consequently, it is sometimes preferable to filter this signal to make it more continuous, which introduces further time lag. Such measurement time lags limit the benefits offered by the first motor speed regulator, since they impair its dynamics. The use of high resolution position sensors (for the first motor and the second motor) is essential in order to increase the control dynamics for the first motor.

To this end, a powertrain according to the invention is characterised in that the second motor engages with the crank axle and the first motor is connected to the sun gear, the planet carrier being connected to the output chainring of the powertrain and the ring gear being connected to the pedal.

Since the first and second motors are equipped respectively with a first and second sensor, each being designed to measure the angular position of the motor to which it is assigned, said first and second sensors are connected to a control unit, with which a third sensor is also connected, said third sensor being designed to measure the speed at which the bicycle is propelled by the cyclist, said powertrain comprises a first and a second measuring element respectively designed to produce a current measurement signal (image of the torque in a DC motor) passing across the windings of the first and second motors respectively, and said control unit is designed to regulate the two motors on the basis of the angular positions measured by the sensors, the currents passing through the motor windings and other coefficients. The first motor is regulated in a closed loop according to an angular position setpoint that is a function of the angular position of the second motor and a coefficient specific to the desired speed ratio. The second motor is regulated in a closed loop according to a current setpoint (image of torque) which is a function of the current of said first motor and the desired level of assistance (ratio of electrical power supplied to the total power at the wheel).

The second motor assists the cyclist's pedalling movement since it is engaged with the crank axle. The sum of the power produced by the pedalling cyclist and the power of the second motor is transmitted to the first input of the planetary gearing via the ring gear. The first motor is attached in fixed manner to the second input of the planetary gearing, that is to say the sun gear. The output chainring, which normally drives the wheel via a chain, is attached in fixed manner to the planetary gearing output via the planet carrier. The speed of the output chainring is thus a linear function of the speeds of the two inputs, that is to say the ring gear and the sun gear, and its torque is linked directly to the torque of the two inputs by the double equality of the torques of the planetary gearing. In this way, the two motors both contribute to assisting the cyclist as he pedals. One of the advantages of this equation connecting the three torques from the three parts of the planetary gearing and of the configuration of the electric motors with respect to these three parts is that it makes it possible to identify the torque transmitted by the cyclist to the pedal by deducting the current measurements in each of the two motors. This makes it possible to create a powertrain with proportional assistance without an additional torque sensor on the pedal.

Each of the two motors has a unique function as part of this powertrain. The function of the first motor is to ensure that the speed ratio setpoint is maintained at all times, whether it is set by the user or calculated in real time by the control unit as a function of the travel speed of the bike and the torque transmitted to the pedal by the cyclist. The function of the second motor is to provide the additional torque necessary to maintain the setpoint for the assistance level selected by the user.

The propulsion system may also operates according to a special, zero assistance case, which means that the cycle receives no assistance in his efforts. This operating mode is useful, for example in the event that the system battery is flat, or in certain legal systems when the vehicle exceeds a certain travelling speed. To ensure that the cyclist can always benefit from the full range of speed ratios, said first motor needs electrical energy. In the given special case, said second motor can function as a generator to provide the requisite current to the first motor. At all events, the laws of control of the two motors remain the same.

With reference to the powertrain known from patent application WO 2013/160477, new control methods have been implemented to help enhance riding comfort and/or performance and/or energy consumption and/or the value of the installed motive power.

Other possible variations that function according to the same principle will also be described subsequently in this description.

The invention will now be described with the aid of the drawing, which shows preferred embodiments of a powertrain according to the invention. In the drawing:

FIG. 1 is a schematic cross sectional illustration of the preferred embodiment of the powertrain according to the invention;

FIG. 2A-2B the regulation schematics for the two electric motors included in the powertrain;

FIG. 3 is a graphical representation of a method of controlling the assistance provided to the cyclist;

In the drawing, the same reference numeral has been assigned to identical or similar elements. The invention will be described for an application of the powertrain to a bicycle. However, the invention is not limited to a bicycle and can be applied to any vehicle with pedals.

Figure 1:
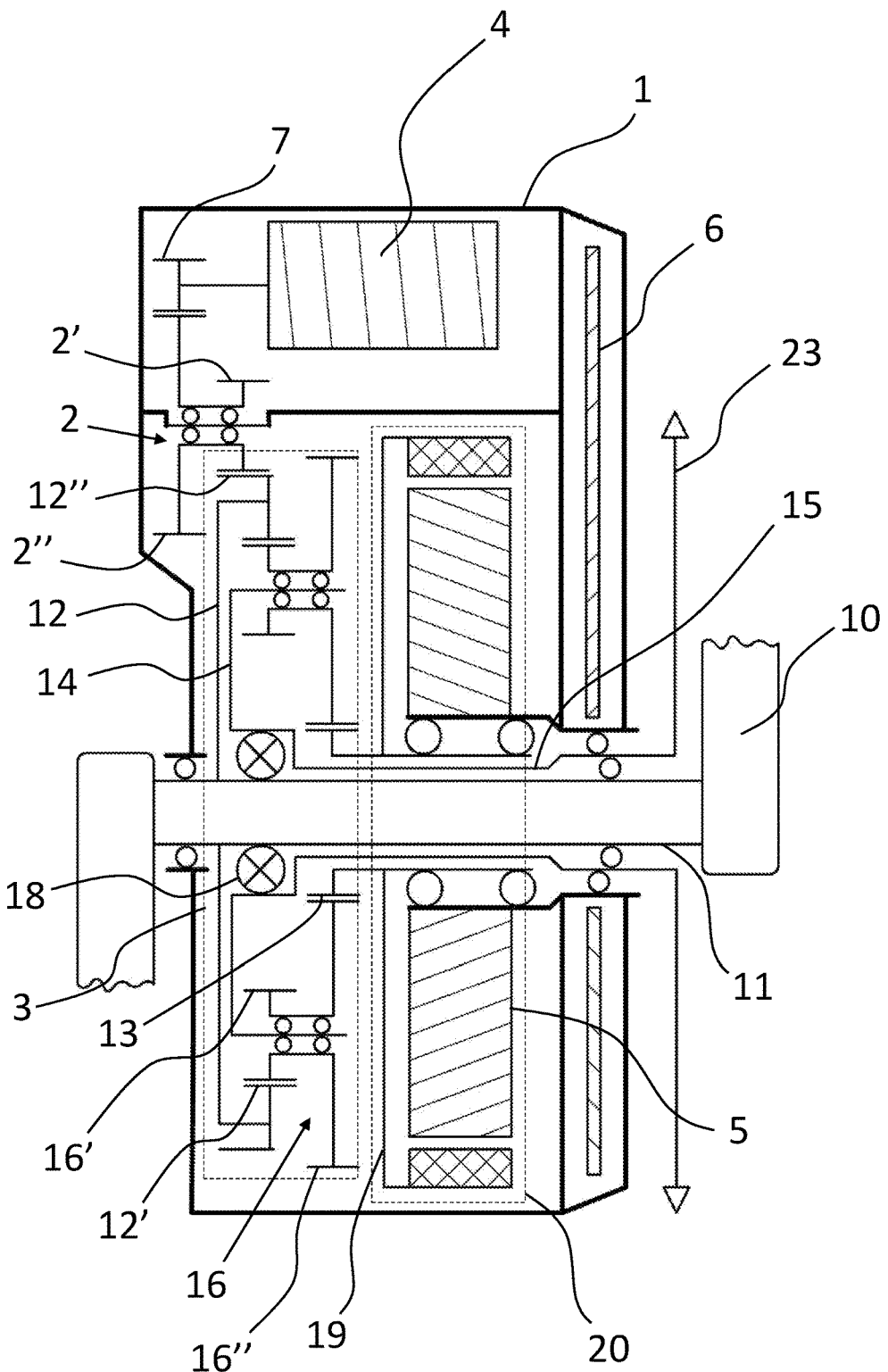

FIG. 1 represents an embodiment of the powertrain according to the invention. All of the components of the system are fitted inside a housing, which in turn is fixed to the frame du bicycle. Crank axle 11 passes through the housing and is mounted on a bearing inside it. As on any pedal, two cranks 10 are attached to either side of crank axle 11. Crank axle 11 is attached to ring gear 12, which is a part of planetary gearing 3.

Planetary gearing 3 consists of three independent parts, that is to say sun gear 13, planet carrier 14 and ring gear 12. Planet carrier 14 supports a number of planet gears 16. The sun gear, the planet gears and the ring gear are preferably gears, but may also be in the form of roller gears, which transmit tangential force by contact. The sun gear is preferably mounted in fixed manner on the rotor 19 of first motor 20. Ring gear 12 is fixed to crank axle 11. Planet carrier 14 is fixed on an axle 15, which is hollow for this preferred embodiment and is itself connected to output chainring 23. Output chainring 23 drives the rear wheel of the bicycle, via a chain or a belt, for example. Planet carrier train 14 also comprises a set of planet gears 16, which serve to connect the internal toothing 12' of ring gear 12 with the toothing of sun gear 13. In this preferred embodiment each planet gear 16 double gear comprising a small gearwheel 16' that engages with the interior toothing 12' of ring gear 12 and a large gearwheel 16" that engages with the toothing of sun gear 13. Small gearwheel 16' and large gearwheel 16" of planet gears 16 are attached immovably relative to one another. These double planet gears make it possible to increase the reduction ratio between the first electric motor and the output, and to increase the average rotating speed of the first motor, thus increasing the torque it can transmit.

First motor 20 comprises a stator 5 and a rotor 19. Stator is mounted on the powertrain housing. The first motor is connected to a sun gear 13, which is a part of planetary gearing 3. The function of said first motor is to multiply the speed of output chainring 23 by increasing its own speed. In fact, the speed of planet carrier 14 is a weighted total of the speeds of the sun gear and the ring gear. The first motor changes the transmission speed ratio (transmission ratio seen from crank axle 11 towards output chainring 23 of the system) of the powertrain by changing its speed relative to that of the pedal.

Second motor 4 assists the rotation of crank axle 11 via the external toothing 12" of ring gear 12, so that the desired level of assistance (ratio of electrical power supplied over the total power of the wheel) is applied correctly. Power is preferably transmitted between second motor 4 and ring gear 12 by means of a double gearwheel 2, which consists of a small gearwheel 2' engaging in the exterior toothing 12" of ring gear 12, and a large gearwheel 12" engaging in sprocket 7 which is mounted in fixed manner on the rotor axle of second motor 4. Small gearwheel 2' and large gearwheel 2" are attached to one another in fixed manner. In most cases, second motor 4 has an assistance function, but in some cases according to the invention it may also brake the pedal and recover the electrical energy to return it to the battery and/or first motor 20. This is the case for example when the cyclist decides to select an unassisted mode or when the battery is flat and the cyclist still wishes to take advantage of the system gearbox. In fact, it is essential to supply power to first motor 20 if one wishes to ensure a right speed ratio.

In the preferred embodiment, control unit 6 is accommodated in the same housing 1, in a space intended for this purpose. Control unit 6, in the form of an electronic board, supplies the two electric motors and is connected to the various system sensors.

In normal operation, the cyclist and second motor 4 drive ring gear 12 of the planetary gearing. First motor 20 drives sun gear 13 of the planetary gearing. Ring gear 12 and sun gear 13 in their turn drive the planet gears 16, causing planet carrier 14 to rotate, wherein the planet carrier is connected to output chainring 23 of the powertrain. The rotating speed of the output chainring depends on the rotating speed of sun gear 13 and the rotating speed of ring gear 12.

An operating mode in which the transmission ratio of the powertrain is fixed mechanically to the smallest ratio is provided. This lowest mechanical transmission ratio is obtained by installing a freewheel between two rotating elements of the system. In the preferred embodiment of the invention, freewheel 18 is installed between crank axle 11 and planet carrier 14 with the effect that planet carrier 14 cannot rotate more slowly than crank axle 11. This operating mode is useful in three cases. The first case is a breakdown of the electrical and/or electronic system, and enables the cyclist to return home without assistance at the lowest speed ratio. The second case is the one in which the cyclist decides to select an unassisted operating mode and wishes to pedal at the smallest speed ratio. In this case, the supply from both motors is cut off to reduce energy consumption. Another method is that of the operating mode on steep gradients, which will be explained later in this description.

FIG. 2A-2B show the regulation schematics for the two electric motors included in the powertrain according to the invention.

In normal operating mode (excluding the steep gradient operating mode described in FIGS. 5A-5B), first motor M1 is regulated in a closed loop according to an angular position setpoint θrefM1 which depends on the angular position θmesM2 measured on second motor M2 and a variable A which is a function of the desired transmission ratio. In fact, if factor A is varied, the speed ratio of the powertrain is also changed. It should be noted that angular position θmesM2 of the second motor is directly related to the angular position of the crank axle because these two elements are connected by a mechanical non-slip transmission. Angular position setpoint θrefM1 of the first motor is compared to angular position measurement θmesM1 of the same motor, and the difference between the two, called the angular position error θerrM1 of the first motor is entered in a regulator CθM1. This is the operating basis of the powertrain speed changing system. It should be noted that the position sensors of the first and second motors may be of any kind, but are preferably incremental sensors. The most important point with regard to the regulation scheme is in fact the relative separation between the angular position of the first motor and that of the second motor. Regulator CθM1 may be of any kind, but must contain at least a proportional term equivalent to the angular position error θerrM1 of the first motor multiplied by a proportional gain. Thus, the output from regulator CθM1 will increase with the position delay of said first motor relative to said second motor. It is important to note that it is the relative position (incremental type) that is significant, not the absolute position, so there is no need for a position reference. The output from regulator CθM1 may either be the first motor control directly or, preferably, the current setpoint IrefM1 and may be input in a current regulator CIM1 as shown in FIGS. 2A-2B. Interposing a current regulator CIM1 between the output from angular position regulator CθM1 and the first motor control allows greater freedom to control the current. In particular, it is possible to limit reference current IrefM1 of the first motor before introducing it into current regulator CIM1. This is therefore the preferred solution. Current regulator CIM1 receives current error IerrM1 at its input, equalling the difference between current setpoint IrefM1 and current measurement ImesM1 of the first motor. The output from this second regulator operates directly on the control of the first motor, which is preferably duty cycle DCM1 applied to the supply voltage for the motors (supply voltage chopping).

Second motor M2 must be torque controlled. In a DC motor with or without brushes, the torque is directly proportional to the current. Second motor M2 is thus regulated directly in a closed loop according to a current setpoint. This current setpoint depends at least on the current measured on the first motor and on the level of assistance selected by the user of the powertrain. Current regulator CIM2 receives current error IerrM2 at the input thereof, equalling the difference between current setpoint IrefM2 and current measurement ImesM2 of the second motor. The output from this regulator operates directly on the control of the second motor, which is preferably duty cycle DCM2 applied to the supply voltage for the motors (supply voltage chopping). A safety limit is preferably applied to the current setpoint of the second motor to ensure that it cannot force the cyclist's pedalling activity if the cyclist has stopped applying torque to the pedal. The control unit limits the current setpoint of said second motor at all times to ensure that it cannot overcome the torque exerted by the first motor on the sun gear of the planetary gearing on its own. Consequently, the second motor will never be able to turn the pedal by its force alone. This limitation is useful for reasons of safety and comfort when pedalling.

FIG. 3 is a graphical representation of a first method for smoothing the assistance according to the invention. This first method consists of smoothing the combined torque supplied by the two electric motors by applying a time offset to the thrust from the second motor. The diagram in FIG. 3 illustrates the torque provided by the user, the torque from the first motor and the torque from the second motor as a function of the angle of the pedal. The user transmits the force he applies to the crank axle via cranks, which induces an alternating torque in the crank axle. The torque provided by the user is at its maximum when one of the two cranks is almost horizontal. The first motor is regulated to operate at a certain speed, which is proportional to the speed of the pedal. When the user exerts a thrust on one of the two cranks, the pedal accelerates and induces a delay in the angular position of the first motor. The first motor corrects this delay by increasing its torque. The torque supplied by the cyclist and the torque supplied by the first motor are thus in phase relative to each other. The torque applied by the pedal is transmitted to the ring gear of the planetary gearing. The torque equation for planetary gearing dictates that the torque of the ring gear is directly proportional to the torque of the first motor, connected to the sun gear. This means that the greater the torque exerted on the ring gear, the more torque the first motor will have to supply to maintain its angular position setpoint. If the controller decides to increase the torque on the ring gear while pushing on the pedal by introducing the second motor, this will further increase the torque the first motor must apply. This would thus increase the amplitude of the oscillating torque, which is detrimental to the mechanical transmission and for the output from the first motor. Moreover, it requires dimensioning the first motor so that it supplies a great deal of torque.

The method suggested to counter this problem is to dephase the setpoint torque supplied to the second motor in order to fill the torque low points from the first motor, thereby smoothing the total torque supplied to the wheel. It was noted previously that the current setpoint (proportional to the torque) supplied to the regulator depended on the measured current of the first motor. In order to implement this suggested smoothing method, it is helpful to delay or filter the measured current signal to the first motor as a function of the angular position of the pedal. This stabilises regulation, improves efficiency, reduces the constraints in transmission and enables the required size of the motor to be smaller.

Figure 4:
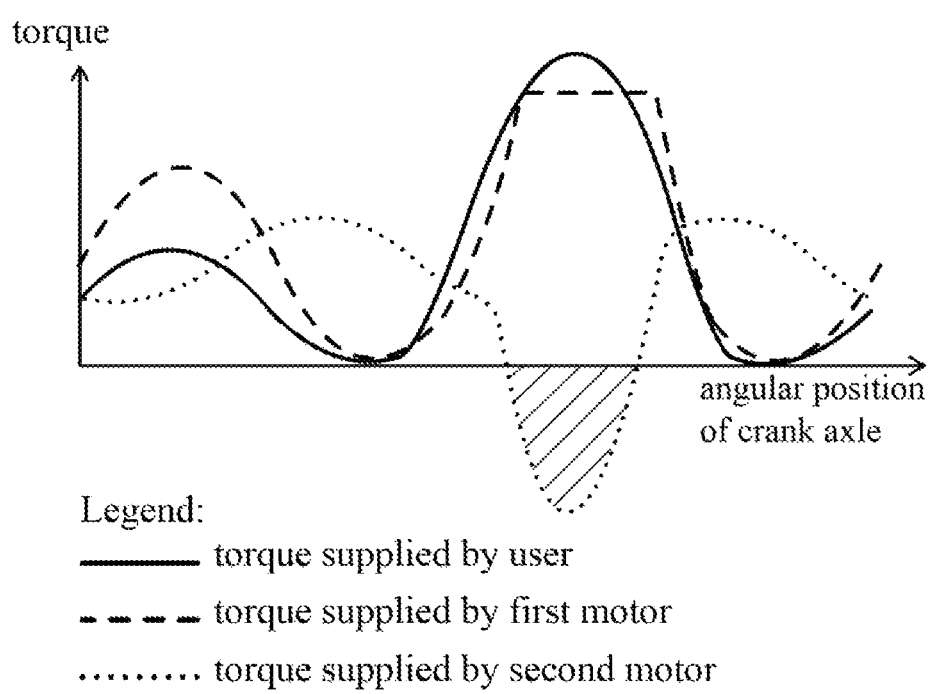
FIG. 4 is a graphical representation of a method for preventing transmission slip.

FIG. 4 illustrates a method for preventing transmission slip, applicable to a specific phenomenon that is particular to this type of powertrain. The human is capable of providing high torque values for short periods and when pedalling speed is low. Given that the torque applied to the pedal is transmitted directly in the opposite direction to the first motor (in keeping with the law of planetary gearing torque), it follows that the motor must generate a great deal of torque very quickly, and so consume a great deal of current in order to maintain its position setpoint. To limit energy consumption and protect the motor windings as well as the gears, it is advisable to limit the maximum torque delivered by said first motor. The drawback of such a limitation is that said first motor will no longer be able to maintain its controlled position setpoint as required when it is saturated at its maximum torque (current limitation), which will produce an unnatural pedalling sensation in which the cyclist will feel his speed ratio fall during the brief period of extra pedal thrust. The cyclist will have the sensation that the torque that is transmittable to the rear wheel of the bicycle will be limited above thrust threshold at the level of the pedal. This sensation is not ideal. The method suggested by the present invention consists in using said second motor in "regeneration" mode, to brake the movement of the cyclist when he exerts excessive thrust on the pedals. The real level of electric assistance will be reduced during this excessive thrust, but said first motor will be capable of maintaining its angular position setpoint and thus also maintain the speed ratio setpoint. FIG. 4 illustrates a situation in which the torque provided by the user increases suddenly and quickly, and reaches a high level. The method applied reduces the setpoint current (and therewith also the torque) for the second motor, and even forces a negative current (negative torque) for a very short time, to allow the first motor to return to its angular position setpoint most effectively without providing excessive torque. During the time when the second motor is braking the pedal, the current returned to the supply bus of the electronic board, where it will either charge the battery or supply some or all of the first motor's power needs. This regeneration zone is hatched in FIG. 4.

Figure 5A:
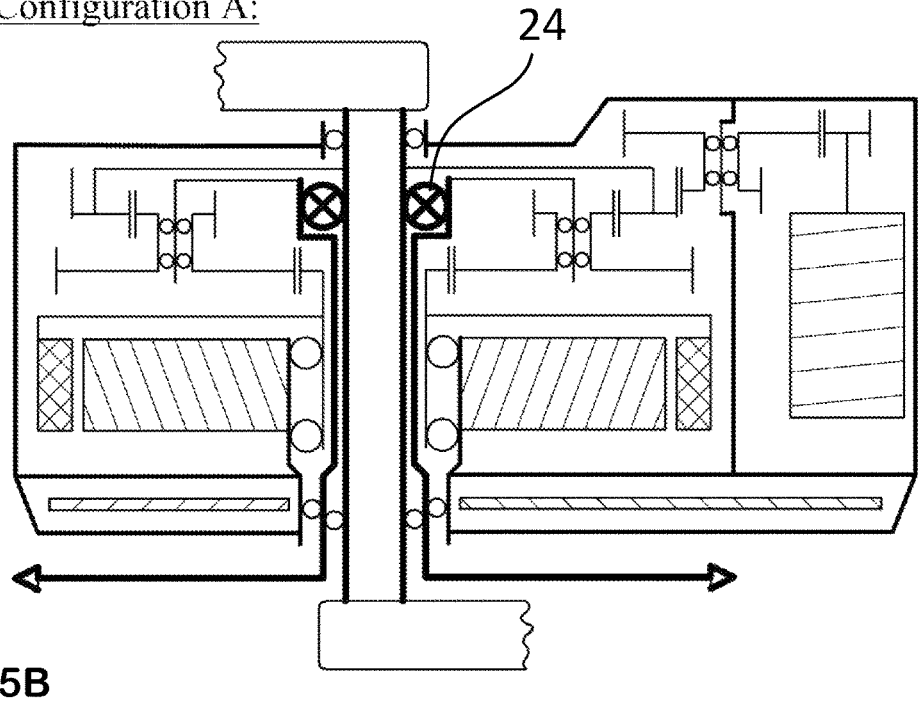
FIGS. 5A-5B are schematic cross sectional illustrations of two possible configurations of the integration of the locking freewheel, useful for a method of controlling the operating mode on steep gradients.
Figure 5B:
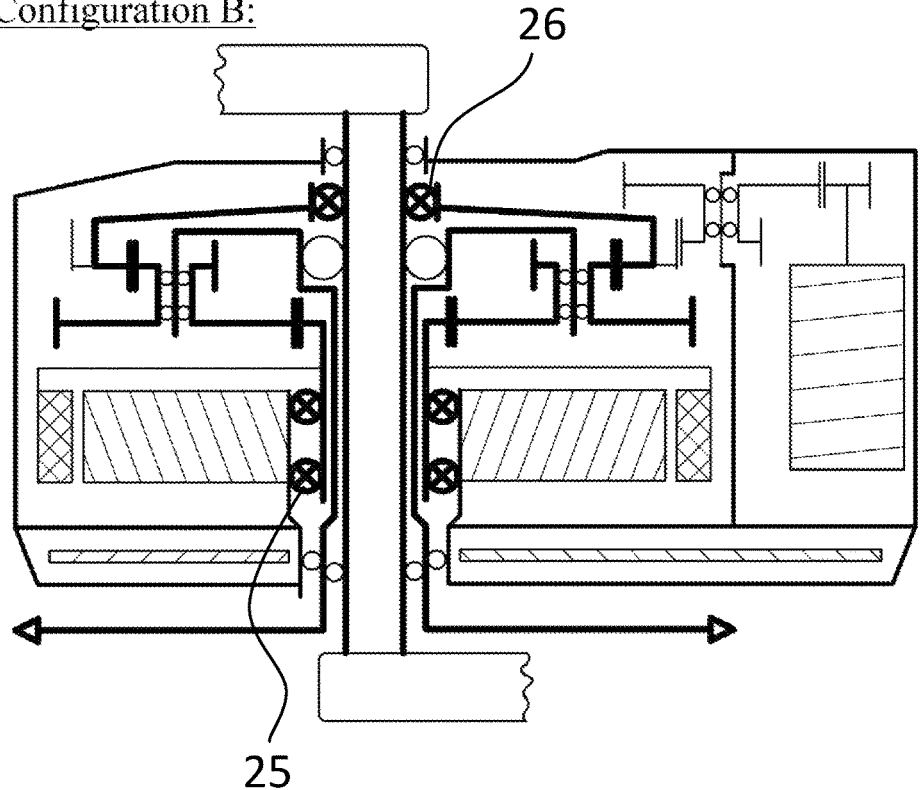

FIG. 5A-5B are diagrammatic representations of said operating mode on steep gradients. This operating mode consists of deliberately causing the system to operate at the lowest possible speed ratio and controlling the two system motors in a different way that normal operation in order to obtain the maximum assistance from the system and/or to cause the system function so as to deliver optimum efficiency on steep gradients. The lowest ratio of the powertrain is a purely mechanical ratio in which the speed of said first motor is limited at the bottom end by locking a rotating part through the interposition of a freewheel. The problem with this mode is that the equation (double equality) uniting the torques of all three parts of the planetary gearing no longer holds true because a freewheel is introduced into the chain. Accordingly, it is no longer possible to measure the torque supplied by the user accurately, and other methods must be implemented to provide appropriate and safe assistance to the cyclist. The preferred embodiment includes a freewheel positioned between the crank axle and the system output, thus preventing the output chainring from turning more slowly than the crank axle. It is also possible to arrange the freewheel between the housing and the rotor of said first motor, which slightly alters the function in this mode. The lowest speed ratio is still purely mechanical and there is no regulation of the first motor according to an angular position setpoint in this operating mode for steep gradients. In both cases, locking is caused by the action of a freewheel, but said freewheel is placed differently depending on the two configurations.

Configuration A, as shown in FIG. 5A, is the preferred configuration as described in FIG. 1. Freewheel 24 is placed between the crank axle and the planet carrier, thus preventing the output chainring for turning more slowly than the crank axle. When freewheel 24 moves into the locking position, there is a 1:1 ratio between the crank axle and the output chainring. The planetary gearing speeds equation also dictates that the sun gear, which is connected to the first motor, also rotates at the same speed. Under certain conditions, the steep gradient mode is activated. In this operating mode, the two electric motors are controlled according to a setpoint current. The setpoint current of the second motor will be close to its maximum current. The setpoint current of the first motor will be such that freewheel 24 will remain in the locking position until the torque supplied by the cyclist falls to below a certain positive threshold close to zero torque. The two motors thus supply power to the output chainring of the powertrain. In this mode and in this configuration A, it is impossible to deduce the torque supplied by the cyclist, but on the other hand it is possible to know if the torque supplied by the user is greater than a certain low positive threshold close to zero torque. This configuration has the further advantage that the strong torque contributed by the user and the second motor passes directly through freewheel 24 without forcing the gears of the planetary gearing. The components via which the torque from the pedal and the second motor are transmitted have been highlighted deliberately in FIGS. 5A-5B. If the gradient of the road becomes less steep while the steep gradient operating mode is active, the system will detect this and will return immediately to the normal operating mode, for which the system allows the entire gear range. If the cyclist decides to stop pedalling, the torque he supplies will fall below a threshold below which the first motor, now controlled directly by the current, will accelerate to rotate faster than the crank axle. At this point, control will switch from the steep gradient operating mode to the normal operating mode, responding naturally to a drop in the torque supplied by the user by causing the controls of the two motors to fall until they stop.

Configuration B, as shown in FIG. 5B, functions a little differently, and is associated with other advantages and disadvantages. Freewheel 25 locks the transmission on the lowest speed ratio, and in this case it is located between the housing and the rotor of said first motor, preventing this motor from rotating in the opposite direction to that of its normal operation. This means that in this steep gradient operating mode and this configuration the first motor will be stopped and will not be powered, locked by means of freewheel 25, which enables better overall efficiency of the motors but less total assistance. In this case, the transmission ratio between the pedal and the output chainring will be lower than 1:1 (the output chainring will therefore rotate more slowly than the pedal), thereby increasing the range of speed change but this time preventing any information about the torque supplied by the user. One disadvantage of this solution is that the torque supplied by the second motor and the cyclist are transmitted via the gears of the planetary gearing. The gears of the planetary gearing must therefore be dimensioned such that they are able to sustain an elevated load such as encountered in a steep gradient situation. The path of the torque supplied by the second motor and the user has been deliberately marked in thick lines in FIGS. 5A-5B. Under certain conditions, the steep gradient mode is activated. In this configuration, only the second motor assists the cyclist's pedalling. The second motor is controlled according to a current setpoint close to its maximum current. If the gradient of the road becomes less steep while the steep gradient operating mode is active, the system will detect this and will return immediately to the normal operating mode, or the system will make the entire gear range available. In order to satisfy the conditions for stopping in this steep gradient operating mode, a second freewheel 26 is disposed between the crank axle and the ring gear of the planetary gearing. Freewheel 26 is in the locking position when the pedal is rotating in the direction of travel, and the crank axle drives the ring gear directly. The cyclist can stop pedalling with complete peace of mind at any time, even if the second motor is still rotating the ring gear of the planetary gearing. If the cyclist decides to stop pedalling, the information will be sent to the control unit via an additional sensor, the measurement from which is used to estimate the rotating speed of the pedal, and the control unit will stop supplying power to the second motor.

For the two configurations described above, the powertrain would preferably be equipped with an inclinometer emitting a road gradient signal. This gradient signal, combined with other physical measurements such as the speed of the bicycle can be used to create a model which estimates the torque supplied by the cyclist when the steep gradient operating mode is activated. This gradient information will make it possible to switch from the steep gradient operating mode to the normal operating mode when the road gradient falls below a certain threshold.

Figure 6:
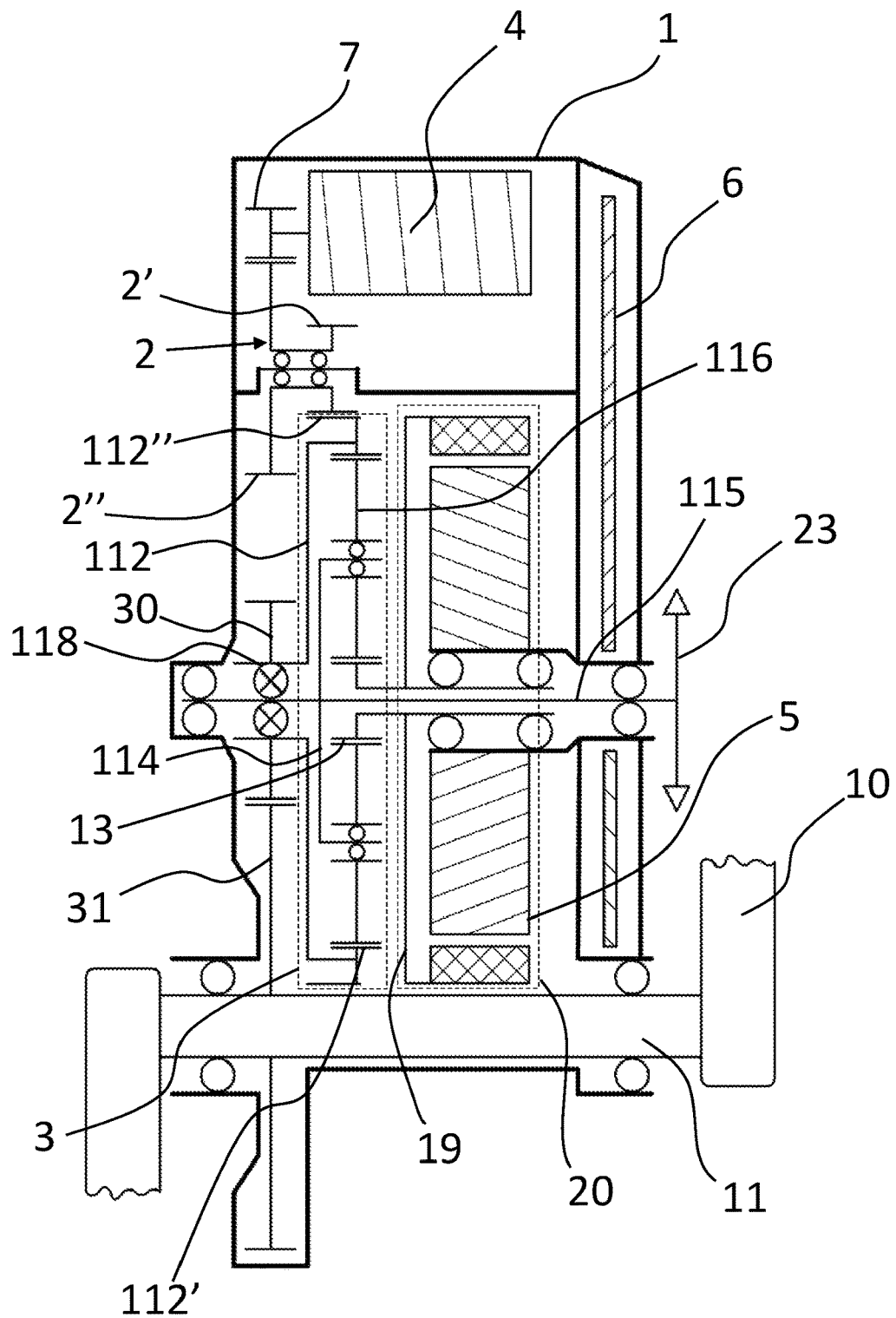
FIG. 6 is a schematic cross sectional illustration of a first variant of the powertrain according to the invention.

FIG. 6 illustrates an interesting first alternative embodiment of the powertrain according to the invention, in which the crank axle effects a reduction between the powertrain and the ring gear of the planetary gearing. Crank axle 11 is attached in fixed manner to a large gearwheel 31, which engages with a small gearwheel 30. Small gearwheel 30 is attached in fixed manner to ring gear 112 of the planetary gearing 3. Planet carrier 114 is mounted in fixed manner on an output shaft 115. A freewheel 118 is interposed between output shaft 115 (connected to the planet carrier) and ring gear 112. Freewheel 118 is positioned so as to prevent output shaft 115 from rotating more slowly than ring gear 112. Simple planet gears 116 are shown in FIG. 6, but it is also possible to use double planet gears as shown in FIG. 1. These simple planet gears engage with the interior toothing 112' of ring gear 112 and with sun gear 13. The external toothing 112" of ring gear 112 engages with double gearwheel 2. This embodiment is interesting because all the components of the planetary gearing rotate at higher speeds and are therefore under less load. This also enables the internal reduction of the planetary gearing to be reduced and the use of simple planet gears instead of planet gears with double toothing. Since the planet carrier rotates more quickly than in the preferred embodiment of FIG. 1, the size of the output chainring can also be reduced.

Figure 7:
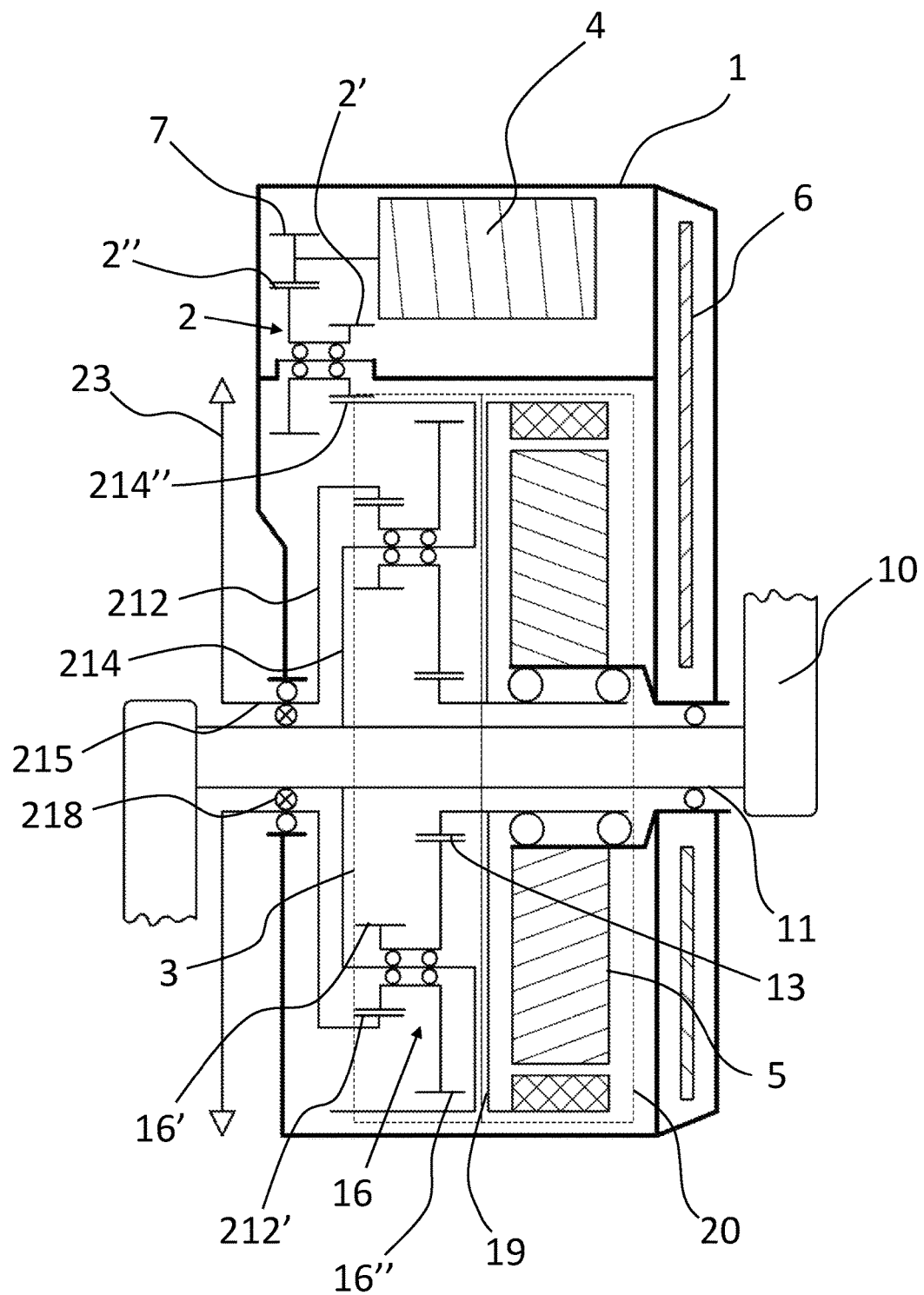
FIG. 7 is a schematic cross sectional illustration of a second variant of the powertrain according to the invention.

FIG. 7 illustrates a second alternative embodiment of the powertrain according to the invention in which crank axle 11 is connected to planet carrier 214 of the planetary gearing and ring gear 212 of planetary gearing 3 is connected to output chainring 23 of the powertrain via a hollow spindle 215. Ring gear 212 only has internal toothing 212'. The torque supplied by second motor 4 is transmitted via double gearwheel 2 to the external toothing 214" of planet carrier 214. Freewheel 218 is disposed between crank axle and output hollow spindle 215 in such manner as to prevent output chainring 23 from rotating more slowly than crank axle 11. The operation according to this embodiment is quite similar to the embodiment of FIG. 1, except that the sun gear must rotate in the opposite direction to the crank axle in order to operate correctly and deliver torque.

With regard to FIG. 7, the inventors therefore suggest a powertrain for a pedal vehicle, particularly a bicycle, which powertrain comprises a first 20 and a second 4 motor and an planetary gearing 3 consisting of a planet carrier 214, a ring gear 212 and a sun gear 13, which first motor 20 is connected to planetary gearing 3, which powertrain also comprises a crank axle 11 to which planet carrier 214 is connected to create a first input to planetary gearing 3, characterised in that the second motor 4 is coupled mechanically (preferably geared) to crank axle 11 and first motor 20 is connected to sun gear 13, ring gear 212 being connected to an output chainring 23 of the powertrain, said first 20 and second motor 4 each being furnished with one or more first or one or more second sensor(s) designed to measure the angular position of the rotor on the motor to which they are assigned, said first and second sensors being connected to a control unit 6, said powertrain comprising measuring elements designed to produce current measurement signals that indicate the torque supplied by first motor 20 and the torque supplied by second motor 4, said control unit 6 being designed to regulate first motor 20 according to an angular position setpoint and second motor 4 according to a current or torque setpoint.

The invention claimed is:

1. A powertrain for a pedal vehicle, the powertrain comprising a first and a second motor, a planetary gearing having a planet carrier, a ring gear and a sun gear, the first motor being connected to the planetary gearing, the powertrain further comprising a crank axle to which the ring gear is connected to create a first input to the planetary gearing, wherein the second motor is mechanically coupled to the crank axle and the first motor is connected to the sun gear, the planet carrier being connected to an output chainring of the powertrain, said first and second motors each having at least one first sensor or at least one second sensor designed to measure the angular position of a rotor on the motor to which the sensors are assigned, said at least one first sensor and said at least one second sensor being connected to a control unit, said powertrain further comprising measuring elements designed to produce current measurement signals that indicate a torque supplied by the first motor and a torque supplied by the second motor, said control unit being configured and operable to regulate the first motor according to an angular position setpoint, and the second motor according to a current or torque setpoint.

2. The powertrain according to claim 1, wherein said second motor is meshed with the crank axle.

3. The powertrain according to claim 1, wherein an angular position setpoint is defined for the regulator of the first motor, the angular position setpoint being at least a function of an angular position measurement of said second motor and of a coefficient that is a function of a speed ratio setpoint.

4. The powertrain according to claim 1, wherein the current setpoint that defines the regulator of said second motor is at least a function of the current measured in said first motor and of the assistance level setpoint.

5. The powertrain according to claim 1, wherein the current setpoint of said second motor is limited in such manner that said second motor is unable to rotate the pedal by force of the second motor alone for the event in which a cyclist applies no torque to a pedal.

6. The powertrain according to claim 1, further comprising an inclinometer that supplies a measurement of a gradient of a road on which a cyclist is riding.

7. The powertrain according to claim 1, wherein the current setpoint of said second motor is applied with a time delay so that assistance peaks of said second motor are in phase with the torque low points for said first motor.

8. The powertrain according to claim 1, wherein the current setpoint applied to the second motor is lowered as far as negative current values when said first motor is no longer capable of maintaining the angular position setpoint.

9. The powertrain according to claim 1, wherein the powertrain incorporates a freewheel placed between an element attached in fixed manner to the ring gear of the planetary gearing and the planet carrier of the planetary gearing, preventing the planet carrier from rotating less slowly than the ring gear.

10. The powertrain according to claim 1, wherein the powertrain incorporates a freewheel positioned between the rotor of said first motor and a housing of the powertrain, preventing the sun gear of the planetary gearing from rotating in the opposite direction to a normal direction of rotation of the sun gear.

11. The powertrain according to claim 1, wherein a gear reduction is effected between the crank axle and the ring gear of the planetary gearing.

12. The powertrain according to claim 1, wherein the planet carrier, the ring gear and the sun gear of the planetary gearing are mechanically coupled via gears.

13. The powertrain according to claim 1, wherein the planet carrier, the ring gear and the sun gear of the planetary gearing are mechanically coupled via rollers, the tangential force of which is transmitted by friction.

14. The powertrain according to claim 1, wherein the first and the second motors are electric motors of the brushless type.

15. The powertrain according to claim 1, wherein the control unit, the first motor and the planetary gearing are accommodated in a housing.

16. A bicycle equipped with a powertrain according to claim 1.

* * * * *